United States Patent [19]
Reynard

[11] Patent Number: 5,765,977
[45] Date of Patent: Jun. 16, 1998

[54] CONTAINER CLAMPING DEVICE

[76] Inventor: Kenneth Reynard, 13D Croftheads, Sowerby, Thirsk, Great Britain

[21] Appl. No.: 765,899

[22] PCT Filed: May 22, 1995

[86] PCT No.: PCT/GB95/01165
§ 371 Date: Feb. 21, 1997
§ 102(e) Date: Feb. 21, 1997

[87] PCT Pub. No.: WO96/00180
PCT Pub. Date: Jan. 4, 1996

[30] Foreign Application Priority Data

Jun. 25, 1994 [GB] United Kingdom ............... 9412821
Apr. 26, 1995 [GB] United Kingdom ............... 9508439

[51] Int. Cl.⁶ ............................................. B60P 7/08
[52] U.S. Cl. ............................ 410/82; 410/70; 410/77
[58] Field of Search ........................... 410/82, 83, 77, 410/69, 70; 24/287; 248/500

[56] References Cited

U.S. PATENT DOCUMENTS

| 506,272 | 10/1893 | Sheehy . |
| 4,321,000 | 3/1982 | Novak ........................ 410/82 X |
| 4,352,613 | 10/1982 | Bertolini .................... 410/82 |
| 4,626,155 | 12/1986 | Hlinsky et al. ............. 410/82 |
| 4,697,967 | 10/1987 | Schulz et al. .............. 410/82 |
| 4,782,561 | 11/1988 | Hayama . |
| 5,183,375 | 2/1993 | Fenton et al. ............. 410/82 X |
| 5,356,249 | 10/1994 | Hove ........................ 410/83 |

FOREIGN PATENT DOCUMENTS

| 0 284 788 | 2/1988 | European Pat. Off. . |
| 0 406 652 | 1/1991 | European Pat. Off. . |
| 2084265 | 12/1971 | France . |
| 35 38 892 | 5/1986 | Germany . |
| 1245535 | 9/1971 | United Kingdom ........... 410/82 |
| 2 209 184 | 5/1989 | United Kingdom . |
| 89 019072 | 3/1989 | WIPO . |

Primary Examiner—Stephen T. Gordon
Attorney, Agent, or Firm—Madson & Metcalf

[57] ABSTRACT

A semi-automatic clamping device (10) for clamping a securing fitting (11) of a container to an anchor point, the fitting (11) having a hollow interior (12), and an entrance aperture (14), and the clamping device (10) having a mounting body (15) and a support surface (16); a shear block (17) projects from the support surface (16) to be received and to be surrounded by the entrance aperture (14); an assembly of a rotatable spindle (18) extending through the shear block (17) and a clamping head (13) rigidly secured to an end of the spindle projecting from the shear block is rotatably mounted to allow the clamping head to be adjusted between release and clamping positions; a mechanism (19) for biasing the clamping head (13) to the clamping position, the clamping head being shaped so that during loading and clamping of a container, the head (13) is rotatable by the securing fitting (11) to allow the fitting to move into engagement with the support surface, and thereafter the head moves under the action of the biasing mechanism to the clamping position; an actuator (21) coupled with the assembly (18, 13) and moveable from an inoperative position to an operative position to adjust the clamping head (13) from its clamping position and to a further position which is at or near to the release position; a mechanism for retaining the actuator in the operative position; and a guide (25) provided on the assembly to be engageable by the respective securing fitting (11), when the clamping head (13) has been adjusted to the further position and the securing fitting is moved away from the clamping device during unclamping and unloading of a container, to release the actuator (21) from the retaining mechanism and allow the clamping head (13) to return to the clamping position.

9 Claims, 6 Drawing Sheets

CONTAINER CLAMPING DEVICE

This invention relates to a clamping device for clamping a securing fitting on a container to an anchor point on an underlying load-supporting platform (or other support), said clamping device being adapted to be mounted at said anchor point and having a clamping head which is receivable within said fitting and which can be pivoted between clamping and release positions relative to said securing fitting.

In this specification, reference is made to a "clamping device" and a "clamping head", which are used to hold-down a container (via respective securing fitting) to anchor points at which the clamping device is mounted. In practice, the clamping head may move relatively freely between clamping and release positions, relative to the securing fittings which receive them, and indeed often there will be a small vertical clearance gap between the underside of each head and an adjacent surface of the fitting which allows a small amount of relative vertical movement, so that the securing fitting is not necessarily rigidly clamped solid to the clamping head, but it will be held-down by the head and restrained against relative separation. The term "clamping device" and "clamping head" are intended to be interpreted to include these possibilities.

Manually operated clamping devices have been used for many years to clamp a container to a load supporting platform provided on e.g. trailer or railway wagons, and are usually manually operated in order to pivot the clamping head between the clamping and the release positions.

Evidently, the head must be adjusted from the clamping position to the release position before a container can be bodily removed from its platform. Also, when a further container is to be loaded on the platform, each clamping device must be in its release position while the container is lowered into position, and then the clamping device is manually adjusted to the clamping position.

The driver often carries out these manual operations, which require him to de-mount from the driver's cab each time. This is time-consuming, and the very important (from a safety point of view) matter of manually adjusting the clamping devices to the clamping position (before the driver returns to the public highway) is dependent entirely upon the attention given to the task by the driver.

When the driver is in a hurry, or otherwise distracted, it can happen that at least some of the clamping devices are not properly manually readjusted to the clamping positions, and this error may not come to light until the load is moving at high speed on the public highway. The fact that improper clamping has taken place will not normally be immediately apparent, since under normal conditions the large mass of the container and its load causes it to be seated reasonably securely on the clamping devices, and it is only when a large upward jolt is applied to the trailer e.g. by mounting a curb at speed, or in a trailer-turnover situation in an accident, that improper clamping of the container to the platform results in the container becoming separated from its platform with potentially disastrous impact on surrounding vehicles, buildings or people.

With a view to reducing the risk of improper clamping going unnoticed, it has been proposed to provide automated or automatically acting clamping devices, which are self-locking when a container is lowered onto the engaging heads of the clamping devices. The heads therefore may comprise so-called "twistlock" type heads carried at the upper ends of spring biased rotary spindles, the spring biasing normally applying torque to each spindle to bias each head towards the clamping position.

However, each corner or other securing fitting on the container (when the container is lowered into position) engages the respective head and applies a rotation to the head against its spring biasing, as the container is lowered, so that the head rotates to an unclamping or release position. The head is held in the release position until the corner fitting becomes fully lowered into engagement with a usual horizontal support surface or seating of the clamping device, and the corner fitting now no longer engages the head and therefore the head is now able to spring back to its clamping position (with the head now located within the hollow interior of the fitting) and so as to hold-down the fitting to the clamping device. The clamping force exerted by the head of the clamping device on each corner fitting therefore resists any relative separation between the container and the platform in an accident.

However, while these automated devices would apparently meet a perceived commercial demand on the grounds of safety, in practice automatic devices have been somewhat complicated in construction, and have also needed regular maintenance, and these two factors have added significantly increased costs (compared to existing manually operated devices), and which, in general, potential customers have not been prepared to bear.

In addition, fully automatic clamping devices must also be capable of becoming automatically unlocking, when it is desired to unload a container from its platform. Fully automatic operation is desirable for both loading, and unloading operations, so that the driver can remain in his cab throughout each operation, which saves time and also reduces the risk of injury in the event of any faulty handling taking place during loading or unloading.

However, while the fully automatic clamping devices can be designed suitably robustly so as to be self-releasing, and then self locking under a triggering action of a downwardly moving loaded container, it is more difficult to design the device (to meet safety standards) in such a way as to enable the device to be self-releasing when an upward lifting force is applied to the container for unloading purposes. Thus, the device must be designed to withstand relative upward separating forces up to a maximum anticipated design load in an accident e.g. a turnover situation, but only to be triggered to the release mode when the maximum design separation force is exceeded by an upwardly unloading force applied to the container.

Entirely manually operated clamping devices therefore remain the norm for many truck operatives, and the designs of these have remained largely unchanged since container borne traffic first developed some thirty-odd years ago. The introduction about ten years ago of fully automatic devices has not met with the anticipated commercial success in view of the problems of cost and complexity referred to above, as well as the need for regular maintenance and servicing.

There exists a very substantial need, therefore, to develop an improved clamping device which is semi-automatic, so that at least some of the advantages of fully automatic devices can be obtained and also having the improvement over manual devices that there is no need for manual operation to ready the device for loading purposes, but which is mechanically simplified and less costly to produce than fully automatic devices.

According to the invention there is provided a semi-automatic clamping device for clamping a securing fitting of a container to an anchor point at which the device is mounted, said fitting having a hollow interior, and an entrance aperture leading to said hollow interior, and said clamping device comprising:

a mounting body securable to said anchor point, and having a support surface on which said securing fitting can be seated, when the fitting and the clamping device are clamped together;

a shear block projecting from said support surface so as to be received and to be surrounded by said entrance aperture when the clamping device and the fitting are clamped together;

an assembly of a rotatable spindle extending through said shear block and a clamping head rigidly secured to an end of the spindle projecting from said shear block, said spindle and clamping head being rotatably mounted so that the clamping head can be adjusted between release and clamping positions with respect to said securing fitting;

means biasing the clamping head to the clamping position, said clamping head being shaped so that when it is in the clamping position and the securing fitting and the clamping device come into engagement during loading and clamping of a container, the head is rotatable by the securing fitting, and against its biasing, to the release position so as to allow the fitting to move into engagement with said seating, and thereafter the head being disengaged and moving under its biasing to the clamping position;

an actuator coupled directly or indirectly with said assembly and moveable from an inoperative position to an operative position in which it is retained and in order to adjust the clamping head from its clamping position and to a further position which is at or near to said release position;

a guide off-set from the axis of the spindle and engageable by the respective securing fitting, when the clamping head has been adjusted to said further position and the securing fitting is moved away from the clamping device during unclamping and unloading of a container, in order to release the actuator from its retained position and thereby allow the clamping head to return under its biasing to the clamping position when the securing fitting becomes separated from the clamping device.

Therefore, in a semi-automatic clamping device according to the invention, the device is automatically operating in the sense that a container can be loaded onto a platform or other support, and become clamped automatically to the clamping devices at the anchor points, by inter-engagement between the respective securing fittings on the container and the heads of the clamping devices. However, release of the clamping devices and subsequent unclamping and unloading of a container can only take place by first operating each actuator to move the heads from the clamping position and to said further position (at or near to the release position). This allows the securing fittings to be raised out of engagement with the clamping devices, but by virtue of the inter-engagement between the securing fittings and the guides, the actuators are released from the retained operative position, and the biasing automatically returns the heads to the clamping positions once the securing fittings have been completely disengaged. A fresh cycle of container loading can then take place, with automatic clamping, and there is therefore substantially no risk of improperly clamped containers going out onto the public highway.

The heads preferably comprise spirally shaped heads, known in the art as "twistlocks".

The actuator may comprise a simple manually operated lever (handle) or other device which is coupled with the spindle and which can rotate the spindle to move the head to its release position.

The biasing preferably comprises a spring biasing arrangement e.g. a torsion spring surrounding the spindle.

As indicated above, the actuator is capable of adjusting the clamping head from the clamping position and to said further position (at or near to said release position), and the guide is capable of causing automatic release of the actuator from its retained position by the engagement of the guide with the moving securing fitting.

The guide may be provided on the clamping head, in which case it is preferred that the further position of the clamping head is close to, but in fact angularly spaced by a small amount from the release position of the clamping head. Then, relative separation of the securing fitting causes the fitting to come into engagement directly with the clamping head, via the guide provided thereon, and this causes the head to move against its biasing by a small amount sufficient to bring the clamping head to the release position, and this then permits further relative separation of the securing fitting from the clamping device with the clamping head passing through the entrance aperture of the securing fitting.

Once the securing fitting has completely separately from the clamping head, the clamping head can then rotate under its biasing to take up again its clamping position. In this position, it is ready for automatic latching, upon loading of a further container on the clamping device according to the invention.

The actuator may be arranged to be retained in its operative position by any suitable means, and in one preferred arrangement, this comprises a latch element mounted on the device and operable, when the actuator is moved to the operative position, to engage the actuator and to hold it in this position and thereby latch the clamping head in said further position.

The latch element may comprise a simple latch which is manually adjustable to a position of holding engagement with the actuator, when the latter is moved to its operative position.

The latch element and a handle arm (forming said actuator) may co-operate by a simple latching engagement formed e.g. by a shaped recess in the latch element which engages part of the outer periphery of the arm (when the latter is in its operative position). However, when the actuator arm is moved by the relative separation of the securing device acting on the guide, the actuator arm disengages the latch and the latch element may move by spring, gravity or other biasing to a disengaged position, thereby freeing the clamping head to revert to its clamping position upon completion of the disengaging action of the securing fitting.

The guide which is off-set from the spindle may be mounted on the assembly of a spindle and head at any convenient location, and may comprise a separate cam component mounted on the spindle. However, the guide may be formed by a guide face or guide edge formed by any suitable shaping of part of the external surface of the head.

The latch element may comprise a lever arranged to be biased to a disengaged position by direct engagement therewith of the actuator arm, when the latter is displaced from its operative position by relative separation of the securing fitting and the clamping device, upon engagement with said guide, and this provides an additional safety feature, in that gravity is no longer relied upon for the disengagement of the latch lever.

The securing fitting may comprise a standard design of hollow casting, e.g. a corner fitting, having a hollow interior which receives the head of the clamping device, and an entrance aperture leading to the hollow interior, and which surrounds the shear block when the fitting and the clamping device are coupled together.

Preferred embodiments of semi-automatic clamping device according to the invention will now be described in detail, by way of example only, with reference to the accompanying drawings, in which.

Figure 2:
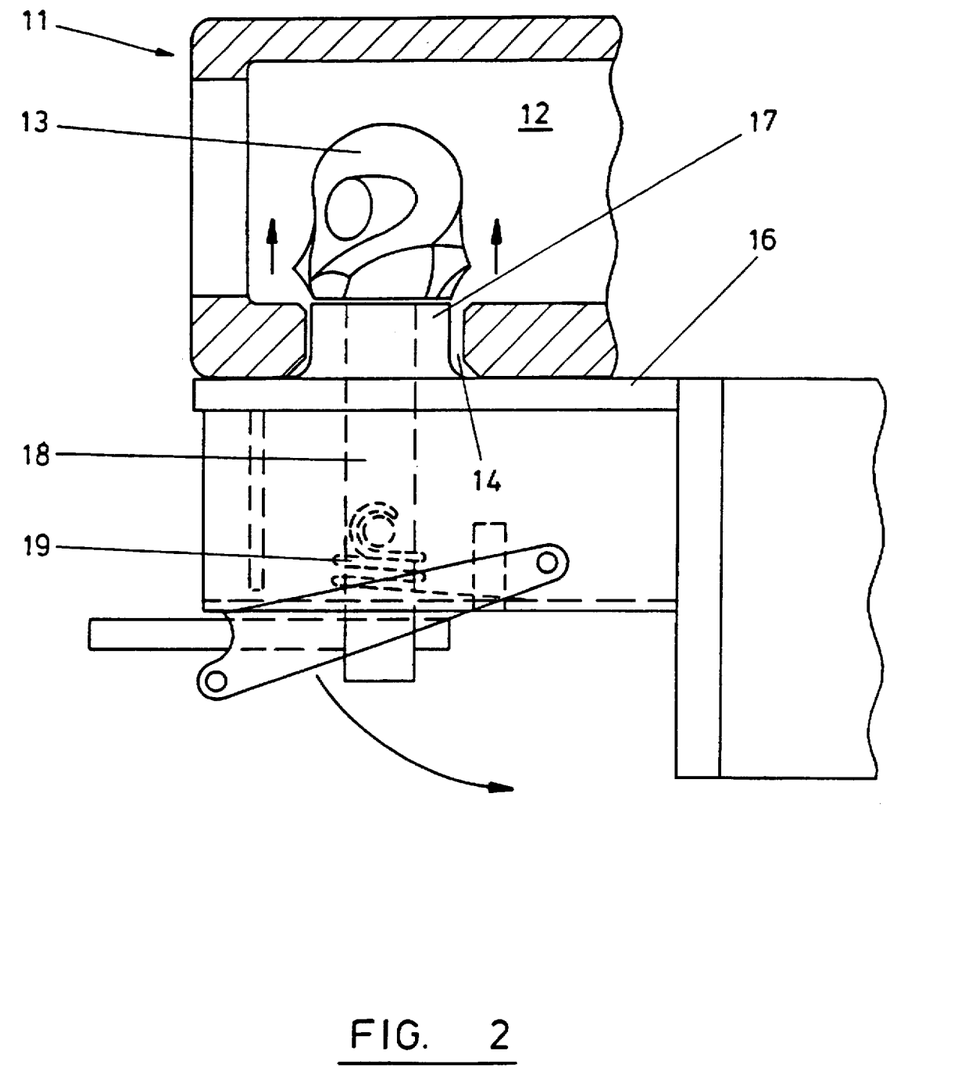
FIG. 2 is a side view of the clamping device, but with the head rotated to a release position, while still located within the hollow interior of the securing fitting, and prior to upward separation of the fitting from the clamping device.

Referring now to the drawings, a semi-automatic clamping device according to the invention is designated generally by reference 10, and is intended to clamp a securing fitting of a container (not shown) to an anchor point on a loading platform or other support (also not shown) at which device 10 is mounted. The securing fitting may be a standard design of hollow securing fitting e.g. a corner casting, as shown by reference 11 in FIG. 2, and which has a hollow interior space 12 in which a head 13 of clamping device 10 is received, and also having an entrance aperture or slot 14 through which head 13 moves during engagement and disengagement. Clamping head 13 has a special external spiral shape, and may be of a type well known in the art as a "twistlock" head.

The clamping device 10 comprises a mounting body 15 in the form of a robust metal mounting block, and which can be secured to any required anchor point on a loading platform to which a container is to be loaded. Mounting body 15 has an upper support surface 16 which forms a seating on which securing fitting 11 can be seated, when fitting 11 and clamping device 10 are clamped together.

A shear block 17 projects from support surface 16 so as to be received and to be surrounded by the entrance aperture 14, when the clamping device 10 and fitting 11 are clamped together. The shear block 17 withstands any transverse loads applied by the securing fitting 11 to the anchor point during transport of the container on the public highway.

Figure 1:
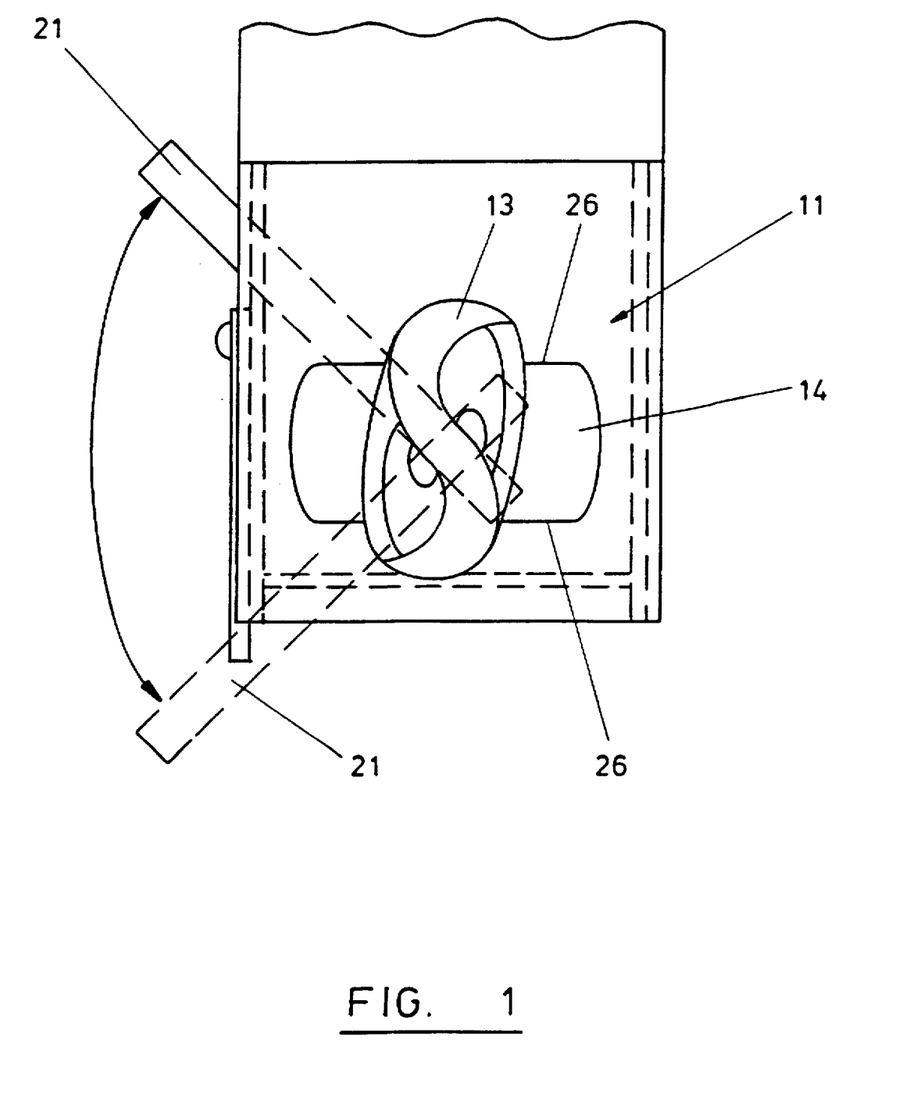
FIG. 1 is a plan view of a clamping head of the clamping device located within the hollow interior of a securing fitting of a container, the head being shown rotated to its locking or clamping position.

The clamping head 13 forms a rigid assembly with a rotatable spindle 18 which extends through shear block 17, and carries clamping head 13 rigidly secured to an end of the spindle projecting from the shear block. The assembly of spindle 18 and clamping head 13 is rotatably mounted both in shear block 17 and also in the mounting body 15, so that the clamping head 13 can be adjusted between a release position, shown in FIG. 2, and a clamping position shown in FIG. 1, with respect to securing fitting 11.

Means is provided to bias the clamping head 13 to the clamping position, and in the illustrated embodiment only, this comprises a spring biasing arrangement in the form of a torsion spring 19 which surrounds the spindle 18, and reacts between fixed stops 20.

The clamping device 10 is automatically operating, in one mode of operation, so as to allow automatic loading and clamping of a container onto the clamping device. The clamping head 13 is therefore shaped so that, when it is in the clamping position, and the securing fitting 11 and clamping device 10 come into engagement during loading and clamping of a container, the head 13 is rotated by the downward engagement of the edge of aperture 14 with the head 13, which rotates the head 13 from its locked position shown in FIG. 1 to a release position, whereby head 13 can then pass through aperture 14 as the fitting 11 moves downwardly towards its engagement with support. However, once the fitting 11 is fully lowered onto the seating, head 13 is now located within the hollow interior 12 of the fitting 11, and can then move under its spring biasing to the clamped position shown in FIG. 1, thereby to complete automatic coupling and clamping of the fitting 11 to the clamping device 10.

However, device 10 is only semi-automatic, in the sense that a further mode of operation can only be permitted after operation of an actuator, preferably in the form of a manually operated handle, lever or other suitable actuator arrangement. As shown in the preferred embodiment, the actuator takes the form of an actuator arm or handle 21, which is coupled with the assembly of spindle 18 and head 13, and most conveniently by being coupled to a lower projecting end 22 of the spindle. Actuator arm 21 can be rotated from a position shown in full lines in FIG. 1, which corresponds to the locked or clamped position of head 13, to a retaining or unlocking position shown by dashed outline in FIG. 1. When arm 21 is moved to the retaining position, it rotates clamping head 13 from the clamping position and to a further position (at or near to the release position) and which then permits automatic unclamping upon relative separation of the securing fitting and the clamping device. This further position, is shown e.g. in FIG. 2, in which the general longitudinal axis of head 13 is substantially coincident with the general longitudinal axis of aperture 14, so that relative vertical separation can take place, after actuation of the device to an automatic unclamping mode.

A latch element 23 is mounted on the device, and is operable, when actuator arm 21 has been moved to the retaining position, to engage the actuator arm 21 and hold it in the retaining position and thereby latch the clamping head 13 temporarily in the release position. Latch element 23 may comprise a lever pivotally mounted on mounting block 15, and movable manually to a latching position, but upon disengagement being movable under gravity, spring or other biasing to a disengaged position, shown in full lines in FIG. 5.

Once the device 10 has been manually set to the release mode, it is then capable of operating automatically, upon relative upward separating movement of securing fitting 11, to allow this separation, and then automatically to revert the clamping head to the clamping position, ready for a further container to be loaded, and automatically clamped in position, whenever required.

To achieve this automatic operation, upon manual setting, a guide is provided having a guide edge or face which is off-set from the axis of spindle 18, and which is engaged by the edges of aperture 14, as the fitting 11 is moved upwardly to unload the container, (while the head 13 is in the further auto-release position), and this causes head 13 to be moved still further away from the clamped position and against its biasing i.e. it moves still further away from the release position, and this then allows latch element 23 to become disengaged from actuator arm 21, and this frees the head 13 to move back under the spring biasing action to the clamping position, but only after the fitting 11 has moved completely out of engagement with the clamping device 10, and particularly the clamping head 13 thereof.

The guide may be provided in any convenient way, and may comprise a separate cam component (not shown) mounted on the spindle 18, and arranged so as to be engageable by any suitable part of the securing fitting 11 as the latter separates from the clamping device 10. However, in a particularly preferred arrangement, the guide is provided by suitable shaped cam surfaces along edges of the helically shaped head forming clamping head 13. These cam edge or surfaces engage the side edges of aperture 14, as the fitting 11 moves upwardly with the container, and this still allows easy free movement of head 13 through the aperture 14 as the separation continues, but does then trigger automatic disengagement of latch element 23, and consequent freeing of actuator arm 21, whereby spindle 18 can rotate under its spring biasing just as soon as head 13 becomes fully disengaged from the securing fitting 11. The cam face therefore may comprise suitably shaped chamfered edges 24 and or 25 on head 13, engaging with side edges 26 of aperture 14, to apply the very small amount of angular rotation to the head 13 sufficient for latch element 23 to disengage from actuator arm 21.

Figure 3:
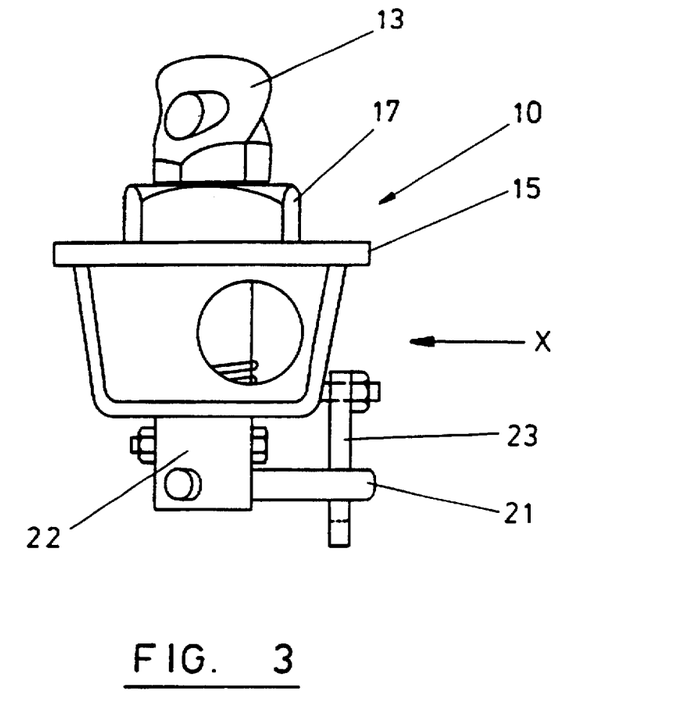
FIG. 3 is a side view of the clamping device, showing further detail.
Figure 4:
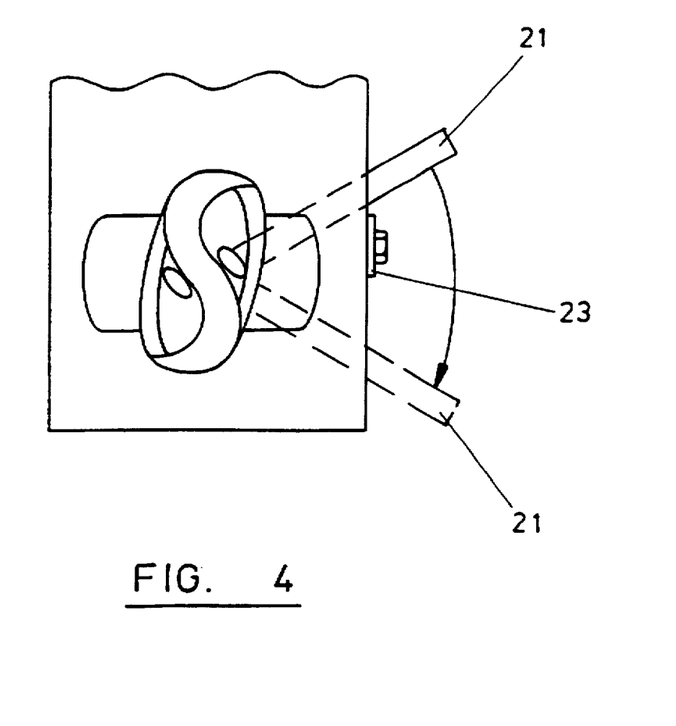
FIG. 4 is a plan view of the clamping device shown in FIG. 3.
Figure 5:
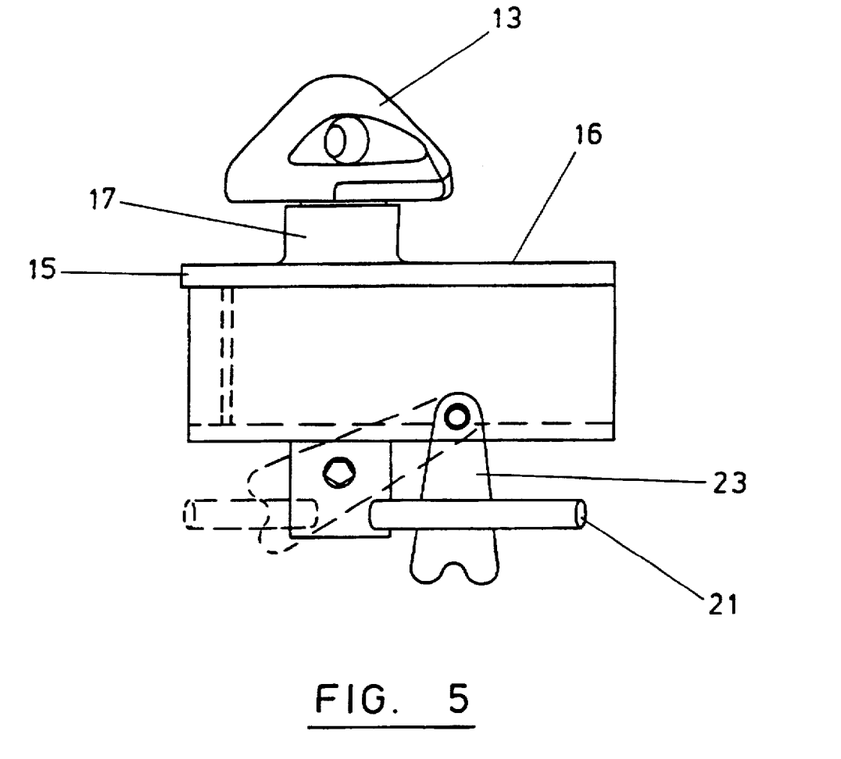
FIG. 5 is a view taken in the direction of the arrow X in FIG. 3.
Figure 6:
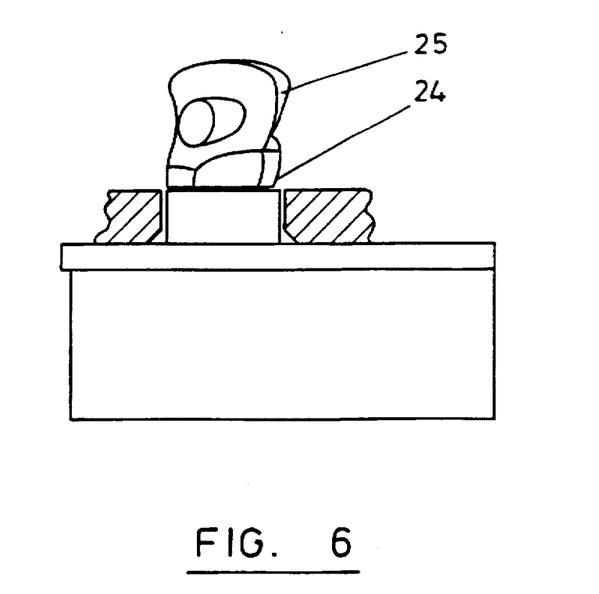
FIG. 6 is a diagrammatic illustration of the disengaging action which takes place when the securing fitting is disengaged from the clamping fitting, after the clamping head has been rotated to the release position.
Figure 7:
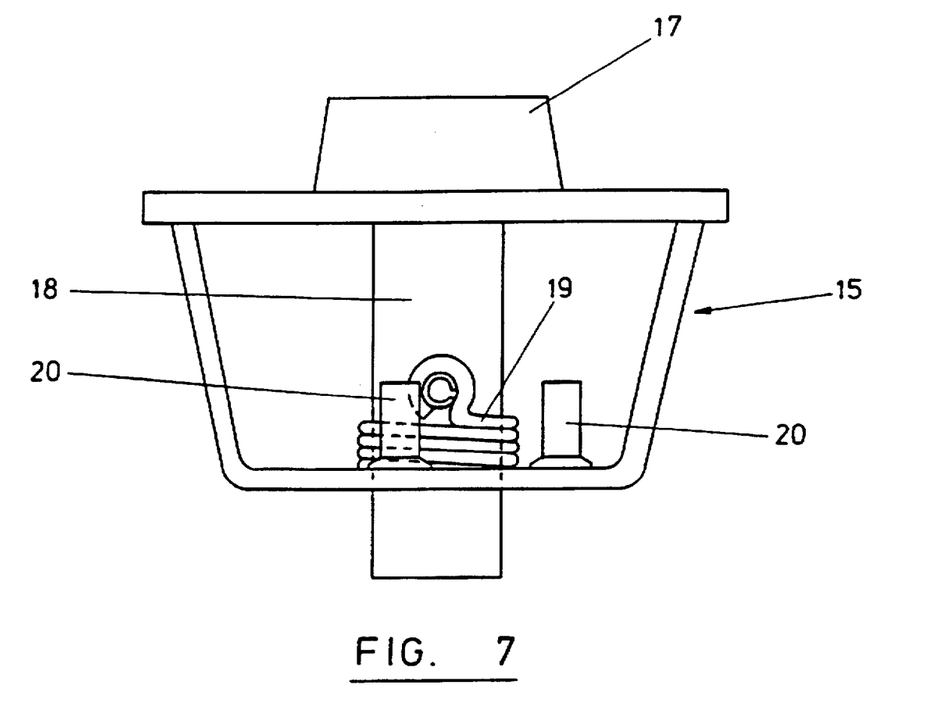
FIG. 7 is a side view, to an enlarged scale, showing a biasing arrangement for biasing the head to the clamping position.
Figure 8:
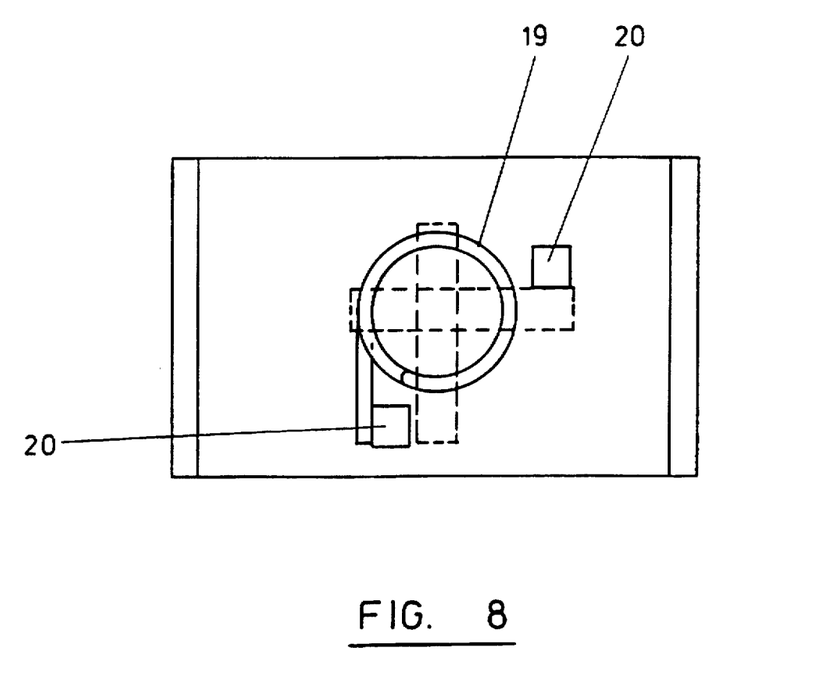
FIG. 8 is a plan view corresponding to FIG. 7.

The nature of the latching engagement between latch element 23 and actuator arm 21 can be seen more clearly in FIGS. 3 and 5.

The above described embodiment has an actuator which is coupled directly with the assembly of spindle and clamping head, and which is moveable from an inoperative position to an operative position in which it is retained (by the latch) and in order to adjust the clamping head from its clamping position and to a further position which is at or near to the release position. This further position is, in effect, an automatic release position, in the sense that it allows the securing fitting to be separated from the clamping device by the interaction between the securing fitting and the guide (cam edge or face) which then triggers release of the actuator from its retained operative position, and thereby allows the clamping head to return under its biasing to the clamping position when the securing fitting has become separated from the clamping device.

In the illustrated embodiment, the guide is formed by a cam face or edge actually provided on the clamping head, and therefore there is direct engagement between the securing fitting and the clamping head (when the clamping head has been adjusted to its auto-release position), and which then rotates the clamping head against its spring biasing so as to permit complete separation between the securing fitting and the clamping device, and at the same time triggers automatic unlatching of the actuator arm.

However, it should be understood that other arrangements of actuator may be provided, coupled directly or indirectly with the assembly of spindle and clamping head. Furthermore, the means used in order to retain the actuator in its operative position may comprise any suitable latching or other device which automatically acts to hold the actuator in the operative position, upon reaching the operative position.

The adjustment of the actuator to the operative position may be carried out by manual operation, or by a power operated device e.g. operated from the driver's cab, if required.

Therefore, while it is desirable, as illustrated in the embodiment of FIGS. 1 to 8, to provide automatic unlatching of the actuator by reason of inter-engagement between the securing device and a guide which is provided on the clamping head, it should be understood that other arrangements are possible, and in fact what is essential to the invention is only that some form of suitable guide is provided on the device, off-set from the axis of the spindle, and which is engageable by the securing fitting, when the clamping head has been adjusted to said further position and the securing fitting is moved away from the clamping device during unclamping and unloading of a container, in order to release the actuator from its retained position. The further position of the clamping head may therefore coincide with the release position, and no further movement of the clamping head may be necessary, in that it can then readily permit relative separation between the securing fitting and the clamping device, and with the automatic unlatching of the actuator, this then allows the clamping head to return to its clamping position under the action of its biasing after the securing fitting has become completely separated from the clamping device.

Figure 9:
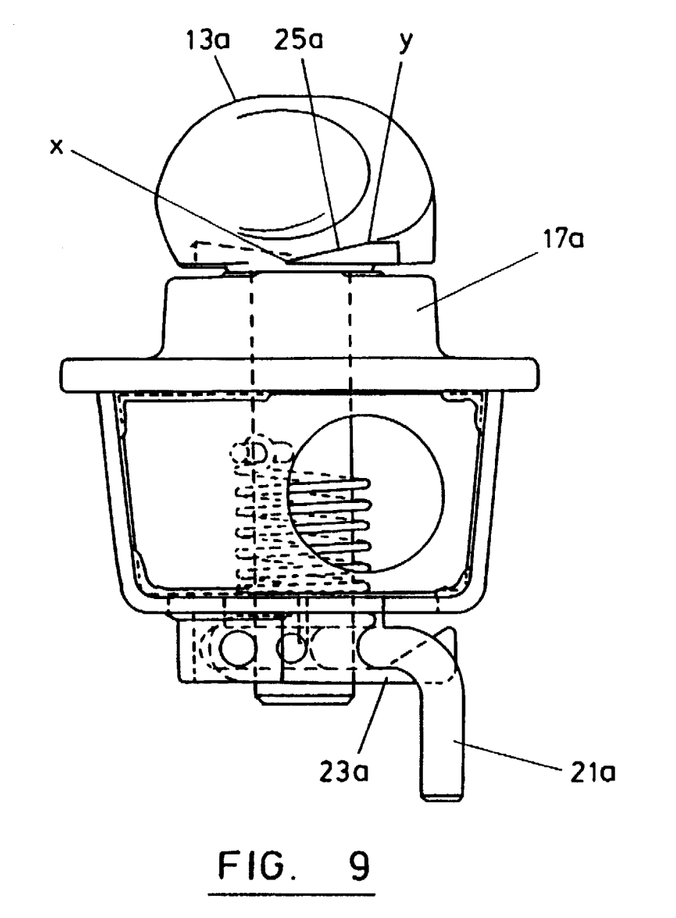
FIG. 9 is a side view, similar to FIG. 3 of a further embodiment.
Figure 10:
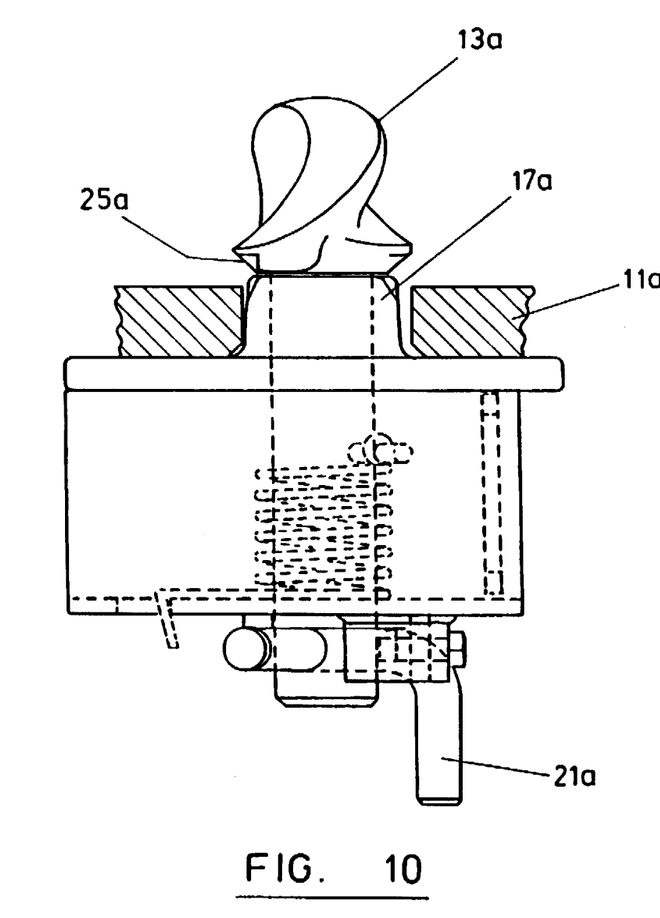
FIG. 10 is an end view of the further embodiment.

A further illustrated embodiment of the invention is shown in FIGS. 9 and 10, and which shows two possible variations to the embodiment illustrated in FIGS. 1 to 8. The variations comprise, first of all, a change in the formation of the "guide", and in which the guide or "cam" action is provided by a guide edge on the underside of the clamping head. In FIGS. 9 and 10, the modified clamping head is shown by reference 13a, and the guide edge is shown by reference 25a. Other corresponding parts are given the same reference numerals as before, but with the addition of the letter a.

As the corner securing fitting 11a is lifted upwards, it contacts the sloping guide edge 25a at some point between its leading and trailing ends x and y. As the edge of the aperture of the securing fitting continues to move upwards, pressure is exerted along edge xy, thereby rotating the head into the fully unlocked position, and also causing release of the gravity latch which has up to now been holding the actuator in the operative position.

The embodiment of FIGS. 9 and 10 also shows an alternative arrangement of the actuator and its latching facility. Actuator arm 21a is moveable between an inoperative position and an operative position, just like actuator arm 21, and co-operates with a latching lever 23a. However, the latching lever 23a can be displaced from the latching position, to allow the actuator arm 21a to move back to its inoperative position, by action other than the gravity action. This provides an additional security feature, in that the cooperation between actuator arm 21a and latch lever 23a is such that further rotation of the actuator head and the spindle against the spring biasing, caused by the inter-engagement between the securing fitting and the "guide" causes the actuator arm 21a to forcibly displace the latch lever 23a from the holding position and thereby releasing the actuator arm 21a to move back to its inoperative position under the action of the spring biasing when the clamping head also returns to its clamping position.

I claim:

1. A semi-automatic clamping device for clamping a securing fitting of a container to an anchor point at which the device is mounted, said fitting having a hollow interior, and an entrance aperture leading to said hollow interior, and said clamping device comprising:

a mounting body securable fast to said anchor point, and having a support surface on which said securing fitting can be seated, when the fitting and the clamping device are clamped together;

a shear block fixed to the mounting body and projecting from said support surface so as to be received and to be surrounded by said entrance aperture when the clamping device and the fitting are clamped together;

an assembly of a rotatable spindle extending through said shear block and a clamping head rigidly secured to an end of the spindle projecting from said shear block, the assembly of said spindle and said clamping head being rotatably mounted on the mounting body so that the clamping head can be adjusted between release and clamping positions with respect to said securing fitting;

means biasing the clamping head to the clamping position, said clamping head being shaped so that when it is in the clamping position and the securing fitting and the clamping device come into engagement during loading and clamping of a container, the head is rotatable by the securing fitting, and against its biasing, to the release position so as to allow the fitting to move into engagement with said support surface, and thereafter the head being disengaged and moving under the action of said biasing means to the clamping position;

an actuator coupled directly or indirectly with said assembly and moveable from an inoperative position to an operative position in order to adjust the clamping head from its clamping position and to a further position which is at or near to said release position; means for retaining the actuator in said operative position; and a guide provided on said assembly and off-set from an axis of the spindle to be engageable by the respective securing fitting, when the clamping head has been adjusted to said further position and the securing fitting is moved away from the clamping device during unclamping and unloading of a container, in order to release the actuator from said retaining means and thereby allow the clamping head to return under the action of said biasing means to the clamping position when the securing fitting becomes separated from the clamping device.

2. A clamping device according to claim 1, in which the actuator comprises a lever coupled with said spindle and which can rotate said spindle to move the clamping head to said further position.

3. A clamping device according to claim 1, in which said biasing means comprises a spring biasing arrangement.

4. A clamping device according to claim 3, in which said spring biasing arrangement comprises a torsion spring surrounding said spindle.

5. A clamping device according to claim 1, in which said guide is provided on said clamping head, and which is engageable by said securing fitting during relative separation of the securing fitting and the clamping device, after the clamping head has been adjusted to said further position.

6. A clamping device according to claim 1, in which said retaining means comprises a latch element arranged automatically to engage the actuator, upon movement of the latter to said operative position.

7. A clamping device according to claim 6, in which said latch element is automatically disengageable from holding engagement with said actuator, upon engagement of the securing fitting with said guide.

8. A clamping device according to claim 6, in which said latch element is moveable under spring, gravity or other biasing to a disengaged position, in order to unlatch the actuator.

9. A clamping device according to claim 1, in which said further position of adjustment of said clamping head comprises said release position, and the engagement between said securing fitting and said guide is such as to effect automatic release of said actuator from its operative position, whereby further relative separation between the securing fitting and the clamping device is permitted by passage of the clamping head through the entrance aperture, followed by rotation of the clamping head back to its clamping position under the action of said biasing means and which is now permitted by the release of the actuator which also returns to its inoperative position.

* * * * *